(12) United States Patent
Mears

(10) Patent No.: US 12,238,121 B2
(45) Date of Patent: Feb. 25, 2025

(54) ASSESSING BEHAVIOR PATTERNS AND REPUTATION SCORES RELATED TO EMAIL MESSAGES

(71) Applicant: SOPHOS LIMITED, Abingdon (GB)

(72) Inventor: John Mears, Wales (GB)

(73) Assignee: Sophos Limited, Abingdon (GB)

( * ) Notice: Subject to any disclaimer, the term of this patent is extended or adjusted under 35 U.S.C. 154(b) by 180 days.

(21) Appl. No.: 17/708,825

(22) Filed: Mar. 30, 2022

(65) Prior Publication Data
US 2023/0319065 A1    Oct. 5, 2023

(51) Int. Cl.
| | |
|---|---|
| *H04L 9/40* | (2022.01) |
| *H04L 51/21* | (2022.01) |
| *H04L 51/212* | (2022.01) |
| *H04L 51/224* | (2022.01) |
| *H04L 51/42* | (2022.01) |

(52) U.S. Cl.
CPC .......... *H04L 63/1416* (2013.01); *H04L 51/21* (2022.05); *H04L 51/212* (2022.05); *H04L 51/224* (2022.05); *H04L 51/42* (2022.05)

(58) Field of Classification Search
CPC ... H04L 63/1416; H04L 51/212; H04L 51/22; H04L 63/1425; H04L 51/42; H04L 51/224; H04L 51/21; G06F 21/56; G06F 16/901; G06F 11/30
See application file for complete search history.

(56) References Cited

U.S. PATENT DOCUMENTS

| | | | |
|---|---|---|---|
| 8,484,295 B2* | 7/2013 | Chasin .................. | H04L 51/212 709/228 |
| 2004/0177120 A1* | 9/2004 | Kirsch .................... | G06F 15/16 |
| 2006/0031359 A1* | 2/2006 | Clegg .................. | H04L 51/212 709/206 |
| 2006/0168024 A1* | 7/2006 | Mehr et al. ............. | G06F 15/16 |

(Continued)

FOREIGN PATENT DOCUMENTS

CN    102567873    *    6/2016    ........... G06Q 10/107

OTHER PUBLICATIONS

Science Direct: Efficient spam and phishing emails filtering based on deep learning, vol. 206, Apr. 7, 2022 (Year: 2022).*

(Continued)

*Primary Examiner* — Oleg Korsak
(74) *Attorney, Agent, or Firm* — IP Spring

(57) ABSTRACT

A computer-implemented method includes generating behavior patterns based on historical behavior of a plurality of emails. The method further includes receiving an email message from a sender, wherein the email message is withheld from delivery to a recipient. The method further includes extracting a plurality of features from the email message. The method further includes determining whether content of the email message matches at least one criterion for suspicious content. The method further includes determining a reputation score associated with the sender based on a comparison of the extracted features with the behavior patterns, wherein the extracted features include an identity of the sender. The method further includes responsive to the content of the email message not matching the at least one criterion for suspicious content and the reputation score meeting a reputation threshold, delivering the email message to the recipient.

20 Claims, 7 Drawing Sheets

(56) References Cited

U.S. PATENT DOCUMENTS

| | | | | |
|---|---|---|---|---|
| 2012/0143798 | A1* | 6/2012 | Sundelin et al. | G06F 15/18 |
| 2013/0325991 | A1* | 12/2013 | Chambers et al. | H04L 12/58 |
| 2015/0237068 | A1* | 8/2015 | Sandke | H04L 63/1425 |
| | | | | 726/23 |
| 2018/0359280 | A1* | 12/2018 | Elworthy | H04L 63/1483 |
| 2020/0076835 | A1* | 3/2020 | Ladnai | G06Q 10/0635 |
| 2020/0389486 | A1 | 12/2020 | Jeyakumar et al. | |
| 2021/0400071 | A1* | 12/2021 | Ray | H04L 63/1441 |
| 2023/0114821 | A1* | 4/2023 | Thomas | H04L 63/20 |
| | | | | 726/23 |
| 2023/0247048 | A1* | 8/2023 | Samosseiko | H04L 63/1425 |
| | | | | 726/23 |
| 2023/0300112 | A1* | 9/2023 | Wood | H04L 63/1416 |
| | | | | 726/22 |

OTHER PUBLICATIONS

IEEE Xplore: IFast and Effective Spam Sender Detection with Granular SVM on Highly Imbalanced Mail Server Behavior Data, Dec. 2006 (Year: 2006).*

ACM Computer and Communications Security: Filtering Spam with Behavioral Blacklisting, Oct. 2007, pp. 342-351 (Year: 2007).*

"Combined Search and Examination Report under Sections 17 and 18(3) mailed Sep. 8, 2023 in GB Application No. 2303417.6", 3 Pages.

"Examination Report in UK Application No. 2303417.6", Jun. 24, 2024, 4 pages.

* cited by examiner

From: Jane Doe <Jane.Doe@Sophos.com>
Sent: 30 June 2021 18:08
To: John Dohn <John.Dohn@website.com>
Cc: Sophos MailOps <SophosMailOps.com>
Subject: [EXTERNAL] Re: SR152539283310 -- Email delivery delays -- Office 365

Suspicious sender: the name Jane Doe has previously been sent from a different email address. Tell me more about this.

Hi John,

Are you at your desk?

Regards,
Jane Doe
Manager, Software Development
C: 888-767-4679

FIG 4

ASSESSING BEHAVIOR PATTERNS AND REPUTATION SCORES RELATED TO EMAIL MESSAGES

FIELD

Embodiments relate generally to assessing behavior patterns and reputation scores related to email messages. More particularly, embodiments relate to methods, systems, and computer readable media that determine behavior patterns of email messages and assign reputation scores to email messages to determine whether to deliver the email messages to recipients.

BACKGROUND

Attempts at using email messages to perform malicious activities are becoming increasingly sophisticated. Previous generation scams involved attacks on the message body; headers; attachments; and Simple Mail Transfer Protocol (SMTP) parameters. Mitigation techniques, such as Domain-Based Message Authentication, Reporting and Conformance (DMARC), Sender Policy Framework (SPF), and Domain Keys Identified Mail (DKIM) have been used to mitigate the effects of such attacks. Because such attacks are well-defined high-volume threats, email providers and applications can combat the threats by determining a signature, deploying the signature, and detecting and/or blocking the malicious emails based on the signature. One disadvantage of signatures is that it takes time to prepare and deploy signatures.

Next generation threats include scams targeting companies that conduct wire transfers and have suppliers abroad (e.g., Business Email Compromise (BEC)), targeted phishing attacks, and account compromise. Next generation threats are more difficult to detect because there is an insufficient volume of the attacks to generate a signature. In addition, even if there is a sufficient volume, next generation threats may take place over a short duration such as a few minutes, which means the delay inherent in preparing signatures makes them infeasible as a sufficient mitigation measure.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments of this application relate to determining whether to deliver the email messages to recipients. A computer-implemented method includes generating behavior patterns based on historical behavior of a plurality of emails. The method further includes receiving an email message from a sender, wherein the email message is withheld from delivery to a recipient. The method further includes extracting a plurality of features from the email message. The method further includes determining whether content of the email message matches at least one criterion for suspicious content. The method further includes determining a reputation score associated with the sender based on a comparison of the extracted features with the behavior patterns, wherein the extracted features include an identity of the sender. The method further includes responsive to the content of the email message not matching the at least one criterion for suspicious content and the reputation score meeting a reputation threshold, delivering the email message to the recipient.

In some embodiments, determining the reputation score is further based on an association of the sender to another sender with a low reputation score. In some embodiments, the method further comprises providing a user interface that includes the email message and an option to report the email message as suspicious. In some embodiments, the method further comprises responsive to the content of the email message not matching any criterion for suspicious content and the reputation score being less than the reputation threshold, alerting the recipient that the email message is suspicious. In some embodiments, alerting the recipient that the email message is suspicious includes providing a user interface that includes an alert and an option to ignore the alert and provide the email message to the recipient. In some embodiments, the method further comprises generating, during offline analysis, cached analytics and comparing the extracted features to the cached analytics, where providing the email message to the recipient is further responsive to the comparing the extracted features to the cached analytics not identifying suspicious content. In some embodiments, generating the behavior patterns based on the historical behavior includes: training a machine-learning model based on training data that includes suspicious content and safe content and providing the extracted features to the machine-learning model, and determining the reputation score is further based on the extracted features provided to the machine-learning model. In some embodiments, the extracted features include one or more of: information from a Simple Mail Transfer Protocol (SMTP) process that generates the email message, results from one or more scanners that perform the scanning, or data added by an enriched scanner context. In some embodiments, the information from the SMTP process includes one or more of: an SMTP client Internet Protocol (IP) address associated with the email message, a number of email messages that were delivered in an SMTP session, wherein the email message is included in the SMTP session, results of a reputation lookup on the SMTP client IP address, whether the sender passed one or more of a Domain-based Message Authentication, Reporting and Conformance (DMARC) test, a Domain Keys Identified Mail (DKIM) test, or a Sender Policy Framework (SPF) test; a HELO parameter or an Extended HELO (EHLO) parameter; SMTP verbs (e.g., "MAIL FROM" versus "Mail From"); whether the email message exited the SMTP early; and/or whether the email message sent an SMTP command before a response from a previous command was received. In some embodiments, the results from the one or more scanners include one or more of: one or more results of reputation lookup in a third-party Domain Name System-based Remote Block List (NDS RBL), one or more results of reputation lookup in local systems, or one or more results of reputation lookup in local systems that are based on a client IP address, a sender domain, or a domain included in an Extended HELO (EHLO) command. In some embodiments, the data added by the enriched scanner context includes one or more of: details of a history of correspondence between the sender and the recipient, whether the sender has an affinity with other senders or clusters of senders and a corresponding reputation score, whether the email message is part of a suspicious pattern of correspondence, or machine-learning scores for machine-learning models that were exposed to the email message and a corresponding graph of correspondence that includes the email message.

A system comprises one or more processors and one or more computer-readable media, having instructions stored thereon that, when executed by the one or more processors, cause the one or more processors to perform operations comprising: generating behavior patterns based on historical behavior of a plurality of emails, receiving an email message from a sender, wherein the email message is withheld from delivery to a recipient, extracting a plurality of features from the email message, determining whether content of the email message matches at least one criterion for suspicious content, determining a reputation score associated with the sender based on a comparison of the extracted features with the behavior patterns, wherein the extracted features include an identity of the sender, and responsive to the content of the email message not matching the at least one criterion for suspicious content and the reputation score meeting a reputation threshold, delivering the email message to the recipient.

In some embodiments, the operations further include providing a user interface that includes the email message and an option to report the email message as suspicious. In some embodiments, the operations further include responsive to the content of the email message not matching any criterion for suspicious content and the reputation score being less than the reputation threshold, alerting the recipient that the email message is suspicious. In some embodiments, the extracted features include one or more of: information from a SMTP process that generates the email message, results from one or more scanners that perform the scanning, or data added by an enriched scanner context.

A computer-program product that includes one or more non-transitory computer-readable media with instructions stored thereon that, when executed by one or more computers, cause the one or more computers to perform operations comprising: generating behavior patterns based on historical behavior of a plurality of emails, receiving an email message from a sender, wherein the email message is withheld from delivery to a recipient, extracting a plurality of features from the email message, determining whether content of the email message matches at least one criterion for suspicious content, determining a reputation score associated with the sender based on a comparison of the extracted features with the behavior patterns, wherein the extracted features include an identity of the sender, and responsive to the content of the email message not matching the at least one criterion for suspicious content and the reputation score meeting a reputation threshold, delivering the email message to the recipient.

In some embodiments, the operations further include providing a user interface that includes the email message and an option to report the email message as suspicious. In some embodiments, the operations further include responsive to the content of the email message not matching any criterion for suspicious content and the reputation score being less than the reputation threshold, alerting the recipient that the email message is suspicious. In some embodiments, alerting the recipient that the email message is suspicious includes providing a user interface that includes an alert and an option to ignore the alert and provide the email message to the recipient. In some embodiments, the extracted features include one or more of: information from a SMTP process that generates the email message, results from one or more scanners that perform the scanning, or data added by an enriched scanner context.

The specification advantageously describes a solution that uses a history of correspondence between the sender, recipient, and intermediaries to identify behavior patterns. The solution also works in near real-time (such as a few seconds to a few minutes) to identify a threat and deploy protective actions. Lastly, the solution also includes scalability and cost, where high volumes of raw data can be processed at a reasonable cost.

BRIEF DESCRIPTION OF THE DRAWINGS

FIG. 4 is an example email message with an alert that the email message is suspicious, according to some embodiments described herein.

DETAILED DESCRIPTION

Network Environment 100

Figure 1:
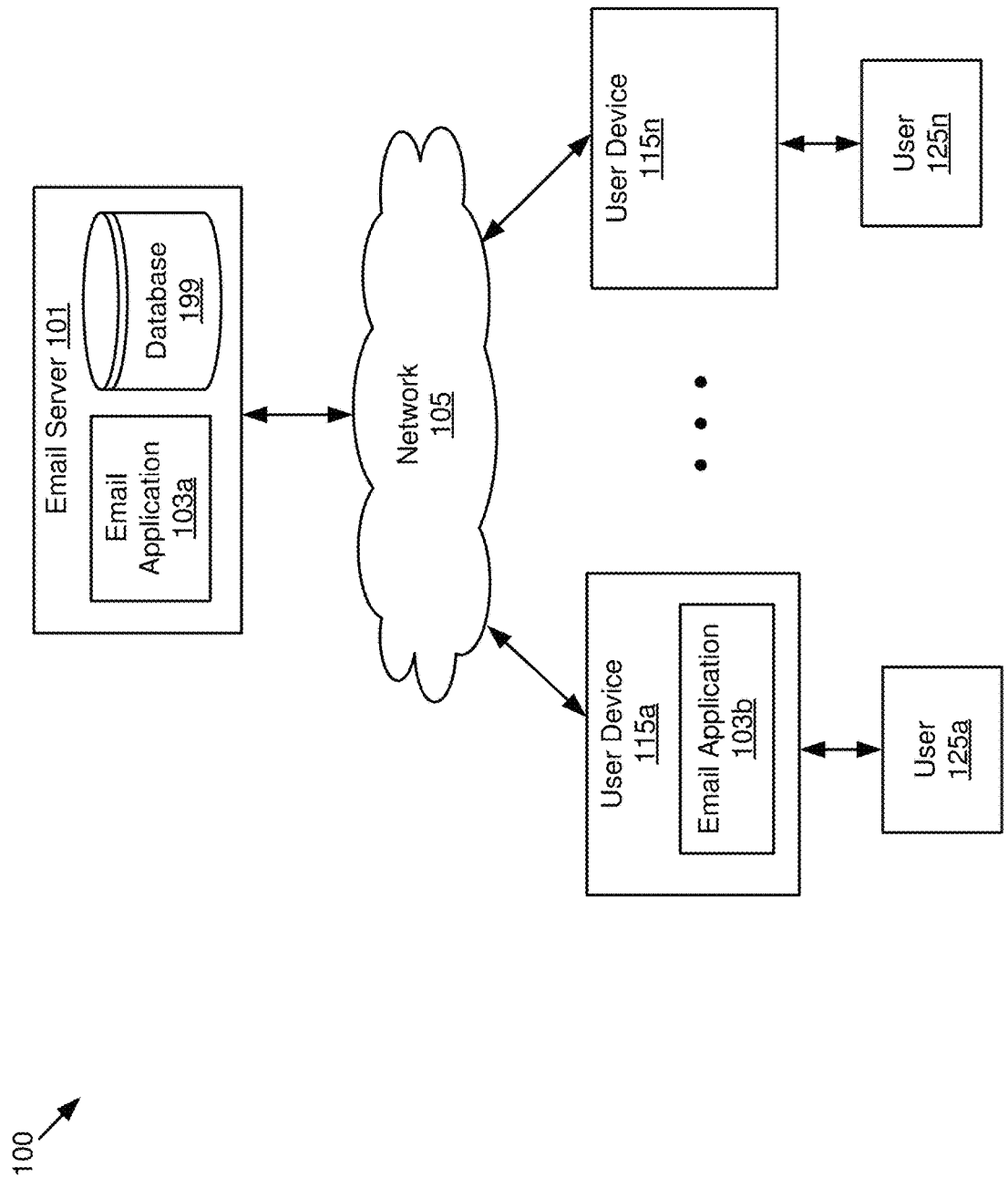
FIG. 1 is a block diagram of an example network environment, according to some embodiments described herein.

FIG. 1 illustrates a block diagram of an example environment 100. In some embodiments, the environment 100 includes an email server 101, user devices 115a, 115n, and a network 105. Users 125a, 115n may be associated with the user devices 115a, 115n. In some embodiments, the environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The email server 101 includes a processor, a memory, and network communication hardware. In some embodiments, the email server 101 is a hardware server. While FIG. 1 illustrates one email server 101, the disclosure applies to a system architecture having one or more email servers 101. The email server 101 is communicatively coupled to the network 105. In some embodiments, the email server 101 sends and receives data to and from the user devices 115a, 115n via the network 105. The email server 101 may include an email application 103a and a database 199.

In some embodiments, the email application 103a receives email messages from senders and delivers the emails to recipients if the emails are detected to not have suspicious content. More specifically, the email application 103 includes code and routines operable to generate behavior patterns based on historical behavior of emails, receive an email message from a sender, determine whether the email message matches at least one criterion for suspicious content, determine a reputation score, and responsive to the content of the email message not matching the at least one criterion for suspicious content and the reputation score meeting a reputation threshold, deliver the email message to a recipient.

In some embodiments, the email application 103a is implemented using hardware including a central processing unit (CPU), a field-programmable gate array (FPGA), an application-specific integrated circuit (ASIC), any other type of processor, or a combination thereof. In some embodiments, the email application 103a is implemented using a combination of hardware and software. In some embodiments, a user accesses the email application 103a via a browser.

The database 199 may be a non-transitory computer readable memory (e.g., random access memory), a cache, a database system, or another type of component or device capable of storing data. The database 199 may store data associated with the email application 103, such as user profile data, historical behavior of senders and recipients, historical behavior of email messages and corresponding content, scan results, etc.

The user device 115 may be a computing device that includes a memory and a hardware processor. For example, the user device 115 may include a desktop computer, a laptop computer, a tablet computer, a mobile device, a smartphone, a wearable device, a reader device, or another electronic device capable of accessing a network 105.

In some embodiments, the user device 115a includes an email application 103b with code and routines operable to send email messages and receive email messages subject to the protections discussed below regarding suspicious content in emails. In some embodiments, the email application 103b receives an email message from the email application 103a stored on the email server and displays the email message. In some embodiments, the email application 103b performs steps for determining whether the email message includes suspicious content and determining a reputation score before delivering the email to the user 125.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the user devices 115 and the email server 101, in practice one or more networks 105 may be coupled to these entities.

Computing Device 200 Example

Figure 2:
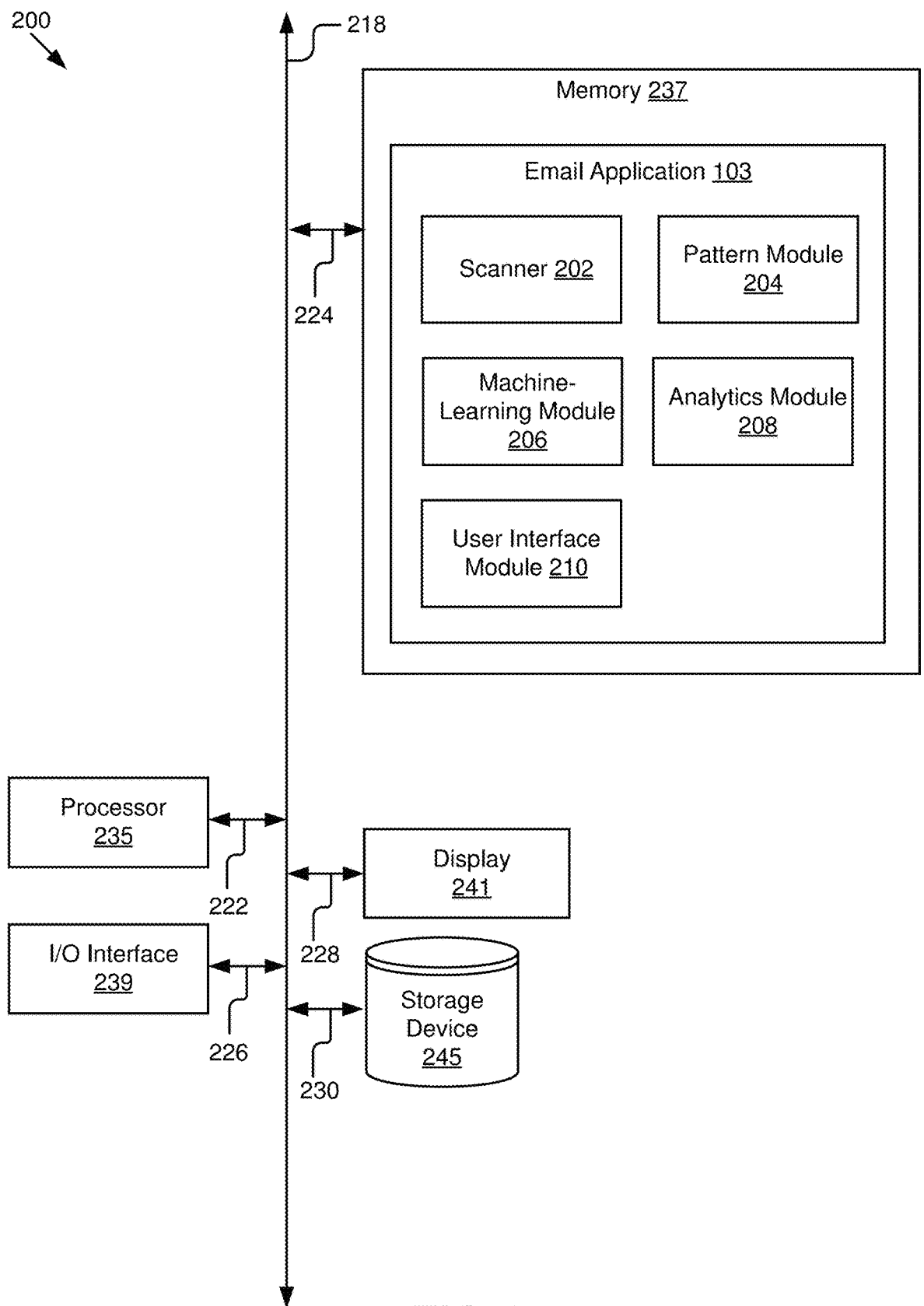
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the email server 101. In some embodiments, computing device 200 is the user device 115.

In some embodiments, computing device 200 includes a processor 235, a memory 237, a I/O interface 239, a display 241, and a storage device 245.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 218 for communication with the other components via signal line 222.

The memory 237 may be a computer-readable media that stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the email application 103, which is described in greater detail below. The memory 237 is coupled to the bus 218 for communication with the other components via signal line 224.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In another example, the I/O interface 239 can receive data, such as email messages, from a user device 115 and deliver the data to the email application 103 and components of the email application 103, such as the pattern module 204. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). The I/O interface 239 is coupled to the bus 218 for communication with the other components via signal line 226.

Some examples of interfaced devices that can connect to I/O interface 239 can include a display 241 that can be used to display content, e.g., an email message received from the sender. The display 241 can include any suitable display device such as a liquid crystal display (LCD), light emitting diode (LED), or plasma display screen, cathode ray tube (CRT), television, monitor, touchscreen, three-dimensional display screen, or other visual display device. The display 241 may be coupled to the bus 218 via signal line 228.

The storage device 245 stores data related to the email application 103. For example, the storage device 245 may store user profile data, historical behavior of senders and recipients, historical behavior of email messages and corresponding content, scan results, etc. In embodiments where the email application 103 is part of the email server 101, the storage device 245 is the same as (or stores) the database 199 in FIG. 1. The storage device 245 may be coupled to the bus 218 via signal line 230.

In some embodiments, components of the computing device 200 may not be present depending on the type of computing device 200. For example, if the computing device 200 is an email server 101, the computing device 200 may not include the display 241.

Example Email Application 103

Various embodiments described herein perform automated computer-based analysis of email messages, including message content and metadata. Such automated analysis is performed with explicit user permission, in compliance with applicable laws and regulations. No content is shared with a third-party or reviewed by a human, other than those authorized by users. For example, the described techniques may be implemented in a security platform that performs automated scanning and threat mitigation. The security platform is configurable and may include various privacy settings. The security platform may be implemented by an email recipient organization, such as an organization (company, university, non-profit, government, etc.) and/or an email service provider. Email messages and/or features extracted from email messages may be stored and utilized in accordance with user-permitted settings.

FIG. 2 illustrates a computing device 200 that executes an example email application 103 stored on the memory 237 that includes a scanner 202, a pattern module 204, an optional machine-learning module 206, an analytics module 208, and a user interface module 210. Although the modules are illustrated as being part of the same email application 103, persons of ordinary skill in the art will recognize that the modules may be implemented by different entities in the operating environment 100. For example, the email application 103*a* on the email server 101 may implement the scanner 202, the machine-learning module 206, and the analytics module 208 while the email application 103*b* on the user device 115 may implement the user interface module 210.

The scanner 202 may include one or more scanners 202 that scan email messages for content and extract features from the email messages. Feature extraction is an automated process using one or more techniques such as text analysis, image analysis, video analysis, or other techniques to extract features from email content and/or metadata. Feature extraction is performed with user permission. Feature extraction can be performed using any suitable techniques such as machine learning, heuristics, pattern matching, hashing, etc. In some embodiments, the scanner 202 includes a set of instructions executable by the processor 235 to scan email messages. In some embodiments, the scanner 202 is stored in the memory 237 of the computing device 200 and can be accessible and executable by the processor 235.

In some embodiments, the scanners 202 scan email messages that are used by the pattern module 204 to determine whether the email message or prior messages are associated with malicious activity, such as a phishing attack, a malware attack, etc. The scanners 202 record the determination of historical behavior of the email messages and determine behavior patterns based on the historical behavior. The scanners provide 202 the behavior patterns to the machine-learning module 206 as training data for one or more machine-learning models. The machine-learning model receives an email message from a user 125 as input and compares it to the behavior patterns to determine whether content of the email message matches at least one criterion for suspicious content and a reputation score for the sender. In some embodiments, the scanner 202 performs one or more of these operations during a Simple Mail Transfer Protocol (SMTP) session.

In some embodiments, the scanner 202 is divided into multiple scanners 202 that each perform a different scanning function. For example, a first scanner 202 may perform feature extraction, such as extracting metadata including identifying a sender, a recipient, identifying an envelope, identifying a header, etc. In some embodiments, the first scanner 202 extracts raw per-email data that includes identity vectors for the sender and all intermediate relays (public and private), Autonomous System Numbers (ASN), Domain Name System (DNS) hosting, and sender and intermediary authentication results. The first scanner 202 may determine whether an email message is an initial email message or a reply email message. Further, the first scanner 202 may receive scanning results from other scanners 202, such as the malware scanner and resulting actions and forward the scanning results to the pattern module 204 and/or the machine-learning module 206.

A second scanner 202 may identify if malware is present in an email message, and optionally, identify the malware. In some embodiments, the second scanner 202 may automatically block any email message that is identified as containing malware. In some embodiments, the second scanner 202 may transmit email messages that contain malware to the pattern module 204 or the machine-learning module 206 to provide examples of malware for analysis, for example, in the form of training data.

In some embodiments, the scanner 202 actions may be classified as extracting: (1) information from a Simple Mail Transfer Protocol (SMTP) process that generates the email messages, (2) results from the one or more scanners 202 that perform the scanning, and/or (3) data added by an enriched scanner 202 context.

The information from the SMTP process may include: senders and recipients of an email message; an SMTP client Internet Protocol (IP) address associated with an email message; a number of email messages that were delivered in an SMTP session; results of a reputation lookup on the SMTP client IP address; whether a sender passed one or more of a Domain-based Message Authentication, Reporting and Conformance (DMARC) test, Domain Keys Identified Mail (DKIM) test, or a Sender Policy Framework (SFP) test; a HELO parameter or an Extended HELO (EHLO) parameter; SMTP verbs (e.g., "MAIL FROM" versus "Mail From"); whether the email message exited the SMTP early; and/or whether the email message sent an SMTP command before a response from a previous command was received.

The results from the one or more scanners 202 may include results of a reputation lookup in a third-party Domain Name System-based Remote Block List (DNS RBL) (e.g., Spamhaus); results of reputation lookup in local systems; and/or results of reputation lookup in local systems, e.g., Sophos eXtensible List (SXL)) that are based on a client IP address, a sender domain, or a domain included in an Extended HELO (EHLO) command.

In some embodiments, the enriched scanner 202 context may include information from the pattern module 204, the machine-learning module 206, and/or the analytics module 208.

The data added by the enriched scanner 202 context may include details of a history of correspondence between the sender and the recipient, such as a number of email messages received during a predetermined amount of time (e.g., day, week, month, etc.), how many of the email messages were initiated by a customer and not by an external person, and/or what was an average length of each exchange. The data added by the enriched scanner 202 content may include whether the sender has an affinity with other senders or clusters of senders and, if so, a corresponding reputation score for the sender. The data added by the enriched scanner 202 content may include whether the email message is part of a suspicious pattern of correspondence, such as when an unknown external sender emails certain groups of customer recipients unprompted. The data added by the enriched scanner 202 content may include or machine-learning scores for machine-learning models that were exposed to the email message and a corresponding graph of correspondence that includes the email message.

The pattern module 204 generates behavior patterns based on historical behavior of email messages, determines whether an email message includes suspicious content, and assigns a reputation score to senders. In some embodiments, the pattern module 204 includes a set of instructions executable by the processor 235 to generate behavior patterns and identify suspicious content. In some embodiments, the pattern module 204 is stored in the memory 237 of the computing device 200 and can be accessible and executable by the processor 235.

In some embodiments, the pattern module 204 receives extracted features from email messages that were extracted by the scanners 202 and determines historical behavior based on the extracted features. In some embodiments, the pattern module 204 updates the historical behavior in real-time as new email messages are received.

The pattern module 204 generates behavior patterns based on the historical behavior. For example, the pattern module 204 tracks a history of emails between senders and recipients because a recipient that often communicates with a sender via email messages is less likely to send malicious content. In another example, the pattern module 204 aggregates counts of senders by recipient and recipients by sender and groups the senders by the similarity of recipients. In some embodiments, the pattern module 204 may generate a graph or nodes that track relationships between senders and recipients.

Figure 3A:
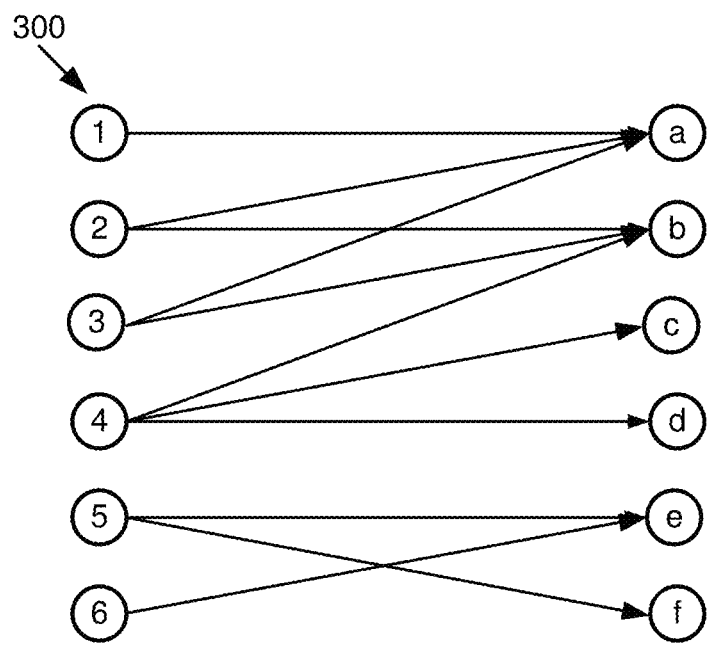
FIGS. 3A-3B are example diagrams that illustrate historical behavior of senders of email messages based on similarity of recipients, according to some embodiments described herein.

Turning to FIG. 3A, an example diagram 300 is illustrated that shows historical behavior of senders of email messages based on similarity of recipients. In this example, sender 1 emails recipient a; sender 2 emails recipients a and b; sender 3 emails recipient a; sender 4 emails recipients b, c, and d; sender 5 emails recipients e and f; and sender 6 emails recipient e.

The pattern module 204 groups senders based on historical behavior of the senders emailing the same recipients. In this example, senders 2 and 3 both email only recipients a and b, so senders 2 and 3 are very similar. Sender 1 only emails recipient a, so sender 1 is somewhat similar to senders 2 and 3 because senders 2 and 3 also email recipient a. Sender 1 is not as similar to senders 2 and 3 and senders 2 and 3 are to each other because sender 1 only emails recipient a and senders 2 and 3 also email recipient b. Sender 5 emails neither recipients a nor b, so sender 5 is different from sender 1 and 2, but sender 5 has some similarity to sender 6 because both sender 5 and sender 6 email recipient e. As a result, senders 2 and 3 are the most similar to each other, and senders 1, 2, 3, and 4 as well as senders 5 and 6 are somewhat similar.

Figure 3B:
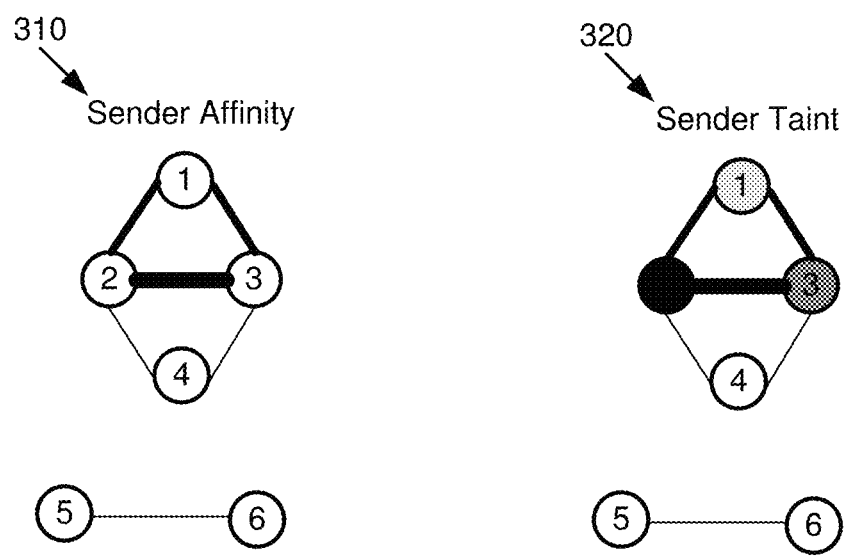

FIG. 3B illustrates a sender affinity graph 310 and a sender taint graph 320 and how the same advantage can become the same disadvantage. In some embodiments, the sender affinity graph 310 and the sender taint graph 320 are generated by the pattern module 204 and stored in the storage device 245. The thickness of the lines in the sender affinity graph 310 and the sender taint graph 320 indicate similarity between the senders based on emailing the same groups of recipients. The sender taint graph 320 additionally includes nodes that are progressively darker as more taint is associated with a node. The pattern module 204 determines that the behavior pattern of certain senders are associated. For example, if sender 2 attempted a business email compromise (BEC), the pattern module 204 would identify sender 3 as also likely to attempt a BEC. Conversely, because sender 4 is more distantly associated with and tainted with the actions of sender 3, sender 4 is less likely to attempt the same BEC. Lastly, because senders 5 and 6 are unassociated with sender 3, they are unaffected by the BEC. As a result, the pattern module 204 uses the thickness of lines in the graphs to propagate good reputation scores and bad reputation scores around the graphs.

In some embodiments, the pattern module 204 generates behavior patterns based on analyzing the body of the email for patterns, such as a language of the text, character encoding, an order of phrases or emojis in the text, etc. In some embodiments, the pattern module 204 generates behavior patterns based on characterization of email messages as a function of time, such as how much spam a sender has sent during a predetermined amount of time (e.g., the last three weeks).

In some embodiments, the pattern module 204 generates behavior patterns for the following variables: a label associated with an email message (e.g., clean, virus, malicious Uniform Resource Locator (URL), etc.), a number of emails from a sender, a number of recipients and domains that a sender emails, a number of times that a sender sent an email message to an n recipient (e.g., first recipient, second recipient, etc.) in the to field, a number of times that the n recipient replied. In some embodiments, the volume of traffic is highly correlated with the reputation score of a sender.

In some embodiments, the pattern module 204 generates criteria for determining suspicious content in an email message. In some embodiments, the suspicious content includes historical features associated with the email address and any aspect of the email message including metadata (e.g., the header of the email address), information from the SMTP protocol, time of day, body of the email message, etc. For example, the historical features may include that the email address arrives from a different route than is previously seen from the sender, the email message fails the DMARC test when email messages from the sender previously passed the DMARC test, etc.

For example, the criteria may include an association of one sender with another sender that is known to send suspicious content, domain addresses that are known to be suspicious, email messages with no text in the body of the email message but that include an attachment, a filename for an attachment that is known to be associated with malicious content, etc.

In some embodiments, the pattern module 204 determines a reputation score associated with a sender of an email message based on a comparison of extracted features with behavior patterns of the sender. For example, the pattern module 204 may use the extracted features to determine the identity of the sender and then retrieve behavior patterns generated for the sender. In some embodiments, the pattern module 204 may generate a profile for a sender that includes different types of extracted features, such as multiple email addresses that are associated with the same sender profile. The reputation score may indicate that a sender is associated with a high risk based on at least one of the domain names for the email address being associated with known email scams, one of the email addresses being new, etc.

In some embodiments, the pattern module 204 determines the reputation score based on extracted features that include an association of one sender with another and behavior patterns. For example, the pattern module 204 may generate a reputation score for a first user that indicates that the first user is associated with a high risk because the first user is in frequent communication with a second user that has a reputation score that indicates that the second user is extremely risky (e.g., is known to send malicious content to other users).

The real-time aspect of the pattern module 204 advantageously enables the pattern module 204 to react to new events rapidly, such as when a sender that was previously determined to be safe suddenly starts deviating from previously determined behavior patterns. The real-time aspect of the pattern module 204 tracks email messages as they evolve in real-time. For example, in one scenario the pattern module 204 identifies when unsolicited email messages are received from an unknown sender that arrive at an organization. The pattern module 204 tracks how some recipients respond and establish conversations and how other recipients forward the email messages to their internal Internet Technology (IT) department. Based on the recipients behavior, the pattern module 204 generates a behavior pattern for the unknown sender. For example, if 99% of the recipients engage with emails from the unknown sender, the pattern module 204 assigns a reputation score indicating that the unknown sender is likely safe.

The pattern module 204 receives extracted features from an email message that is addressed to a recipient. The pattern module 204 determines whether content of the email message matches at least one criterion for suspicious content. For example, the pattern module 204 may determine that the Internet Protocol (IP) address associated with the sender is associated with suspicious content. The pattern module 204 identifies the sender of the email message based on the extracted features.

In some embodiments, the pattern module 204 determines a reputation score associated with the sender based on a comparison of the extracted features with behavior patterns of the sender. For example, the pattern module 204 compares an extracted feature of a recipient of the email to the behavior pattern of recipients that the sender emails to determine whether the sender has been frequently communicating with this particular recipient or if this is a new recipient.

In some embodiments where the pattern module 204 does not generate a reputation score, the machine-learning module 206 trains a machine-learning model (or multiple models) to output a reputation score and updates parameters of the machine-learning model based on feedback. In some embodiments, the machine-learning module 206 includes a set of instructions executable by the processor 235 to train a machine-learning model to output the reputation score. In some embodiments, the machine-learning module 206 is stored in the memory 237 of the computing device 200 and can be accessible and executable by the processor 235.

In some embodiments, the machine-learning module 206 receives training data that includes extracted features that are associated with suspicious content or safe content. For example, the training data may include an email message in which a virus was detected and the parameters (i.e., extracted features) related to the email message. In some embodiments, the determination of suspicious content or safe content are each associated with a confidence level. For example, an email may be identified as 85% likely to include suspicious content based on a reputation score associated with the sender. In some embodiments, the historical behavior and behavior patterns determined by the pattern module 204 are also part of the training data. In some embodiments, the training data includes information from the analytics module 208, such as offline training and analytics as discussed in greater detail below with reference to FIG. 6.

The machine-learning module 206 may train the machine-learning model, using the training data set, to classify content of an email message as suspicious content or not suspicious content. In some embodiments, the machine-learning module 206 generates clusters based on similarity of extracted features. For example, one cluster may relate to similarity of senders, another cluster may relate to a number of emails that were delivered during an SMTP session, another cluster may relate to results of reputation lookup, etc. Different combinations of extracted features that correspond to different clusters are possible.

The machine-learning module 206 may also train the machine-learning model to output a reputation score for the sender associated with an email message. In some embodiments, the machine-learning model generates a cluster of correspondence that includes an email (e.g., a graph), compares the email to the cluster of correspondence, and outputs a reputation score.

In some embodiments, the machine-learning module 206 receives extracted features that correspond to the email message associated with the recipient as input. The machine-learning module 206 outputs a reputation score for the sender based on the extracted features. In some embodiments, the machine-learning module 206 transmits the reputation score to the analytics module 208.

In some embodiments, the machine-learning module 206 updates parameters for the machine-learning model based on feedback. For example, in some embodiments, a user may provide feedback indicating that an email message classified as suspicious is not suspicious. The machine-learning module 206 may modify a parameter related to how one or more extracted features are utilized, based on the false positive. For example, if the machine-learning module 206 output a reputation score for a sender based on a parameter that associated the sender with another sender that was classified as being suspicious, the machine-learning module 206 may modify a parameter such that the association has less of an effect on the similarity of the cluster.

In another example, the feedback may include a situation where a user identifies an email message as suspicious because it includes a phishing attempt when the machine-learning module 206 output a determination that the content of the email message did not match at least one criterion for suspicious content. This is a false negative. In this example, the machine-learning module 206 may modify the parameters of the machine-learning model to include a new criterion as being associated with suspicious content and generates a cluster for the new criterion.

The analytics module 208 determines whether to withhold an email message based on content of the email message matching a criterion for suspicious content and/or based on whether the reputation score meets a reputation threshold. In some embodiments, the analytics module 208 includes a set of instructions executable by the processor 235 to determine whether to withhold the email message. In some embodiments, the analytics module 208 is stored in the memory 237 of the computing device 200 and can be accessible and executable by the processor 235.

The analytics module 208 receives a determination of whether content of an email message matches at least one criterion for suspicious content from the pattern module 204. The analytics module 208 receives a reputation score for the sender of the email message from the pattern module 204 if the reputation score is determined using a rules-based analysis or from the machine-learning module 206 if the reputation score is determined using a machine-learning model.

In some embodiments, if the content of the email message matches at least one criterion for suspicious content and/or the reputation score is less than the reputation threshold, the analytics module 208 instructs the user interface module 210 to generate an alert for the recipient. In some embodiments, the analytics module 208 delivers the email message with the alert, but other options are possible such as delivering a notification that an email message is available but suspicious, delivering an email message with the attachments removed, etc. In some embodiments, the analytics module 208 instructs the user interface module 210 to display some information about the email message without the content of the email message and with an explanation about why the email message was not delivered.

In some embodiments, if the content of the email does not match at least one criterion for suspicious content and the reputation score meets the reputation threshold, the analytics module 208 delivers the email message.

In some embodiments, the analytics module 208 performs analysis of offline information. The offline information may be a larger data set than that used for the behavior pattern analysis because the analytics module 208 analyzes the offline information to determine patterns and outliers during batch processing of the data. In some embodiments, the analytics module 208 aggregates all data received by elements of the email application 103 and performs batch processing to discover patterns and outliers in the data. In some embodiments, the analytics module 208 transmits the patterns and outliers to the machine-learning module 206 to serve as training data for the machine-learning model.

In some embodiments, the analytics module 208 generates cached analytics from the offline analysis as well as the behavior patterns. For example, the analytics module 208 may generate a cache that is part of the storage device 245 from data that is not older than a predetermined time period. The analytics module 208 may compare extracted features of an email to the cached analytics and additionally determine whether to deliver an email to the recipient based on suspicious content that is identified after comparing the extracted features to the cached analytics.

The following is an example use case that includes cached analytics. In this example, the pattern module 204 determines that an email from "Jane Doe"<badhat45551@gmail.com> is suspicious when the recipient has previously seen emails from "Jane Doe" <Jane.Doe@Sophos.com>. In some embodiments, the scanner 202 stores email addresses keyed by domain name to record senders for the domain name and makes this information available as part of the cached analytics via cached analytics, such as a local data cache. The scanner 202 performs a lookup for each domain name encountered in live traffic, and the pattern module 204 compares the email address with previously seen email addresses. If the email addresses are different, the pattern module 204 determines that the content of the email address, namely the email address for the sender, matches a criterion for suspicious content, namely that the email addresses are different. In some embodiments, the pattern module 204 normalizes the domain name by performing case flattening (e.g., such that the terms "Sophos," "SOPHOS," and "sophos" are treated the same), whitespace normalization (e.g., such that the name "Jane Doe" and "Janedoe" are treated the same or "Jane Doe" and "Jane Doe" are treated the same), homograph flattening (e.g., such that pairs of words look the same or very similar to the eye, but actually have different letters such as replacing the Latin letter o with the Greek letter omicron or capital O with the digit 0 are treated the same), nickname normalization (e.g., "Johnnie Doe" and "Jack Doe" are mapped to the same form, such as "John Doe"), and initials normalization (e.g., "John Stuart Doe," "John S Doe," and "Doe, John" are all mapped to the same form, such as "John Doe"). If the recipient matches the same domain name after normalization, the analytics module 208 may deliver the message to the recipient because a person knows if an email is really from themselves.

The user interface module 210 generates a user interface. In some embodiments, the user interface module 210 includes a set of instructions executable by the processor 235 to generate the user interface. In some embodiments, the user interface module 210 is stored in the memory 237 of the computing device 200 and can be accessible and executable by the processor 235.

The user interface module 210 generates graphical data that is displayed by the display 241. The user interface may be displayed on a computing device as part of the email application 103, as a website, or as another graphical interface, and may generally provide an interface for user interaction with the analytics module 208, e.g., for email message management, warnings of suspicious content, network administration, audit, configuration and so forth. The user interface may generally facilitate action on potential threats, e.g., by presenting threats along with other supplemental information, and providing controls for a user to dispose of such threats as desired, e.g., by permitting execution or access, by denying execution or access, or by engaging in remedial measures such as sandboxing, quarantining, vaccinating, and so forth.

In some embodiments, where the analytics module 208 delivers the email message to a recipient, the user interface module 210 generates a user interface that includes the email message. The user interface may include an option to report the email message as suspicious. For example, the user interface may include a button for reporting, a link for reporting, etc.

In some embodiments, where the analytics module 208 determines that content of the email message matches a criterion for suspicious content and/or the reputation score of a sender is less than a reputation threshold, the user interface module 210 may generate a user interface with an alert and an option to ignore the alert and provide the email message to the recipient.

In some embodiments, the user interface module 210 generates a user interface that an administrator can use to modify settings of the email application 103. For example, the user interface may include an option for configuring how email messages are treated when the email message matches a criterion for suspicious content and/or the reputation score of a sender is less than a reputation threshold.

Turning to FIG. 4, an example email message 400 is illustrated with an alert that the email message is suspicious. In this example, the pattern module 204 maintains a count of emails from external senders to users that are recipients and flags email messages using the techniques discussed above. The analytics module 208 determines that the reputation score for the sender is less than a reputation threshold. The analytics module 208 delivers the email message with an explanation about the suspicious content. The user interface module 210 generated a graphical interface that displays the email along with the explanation that "Some people who received this message don't often get email from "Jane.Doe@Sophos.com."

Figure 5:
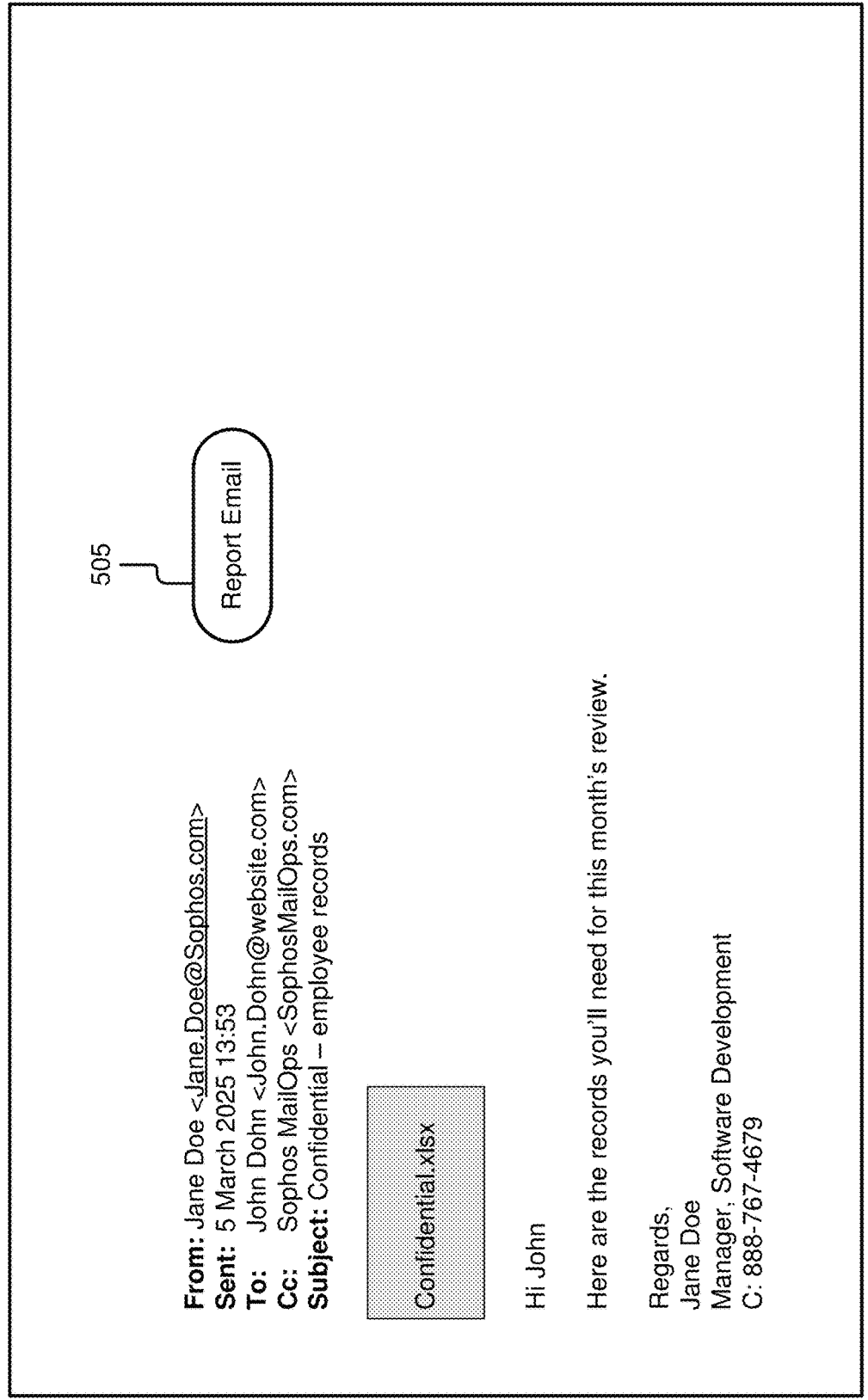
FIG. 5 is an example email message with an option to report a suspicious email, according to some embodiments described herein.

Turning to FIG. 5, an example email message 500 is illustrated with an option to report a suspicious email. In this example, the analytics module 208 determined that the content of the email message does not match at least one criterion for suspicious content and that the reputation score for the sender meets a reputation threshold. As a result, the analytics module 208 delivers the email message to the recipient. The user interface module 210 generates a user interface that includes the email message and also a button 505 for reporting the email in the event that a user decides that the email message is suspicious.

Figure 6:
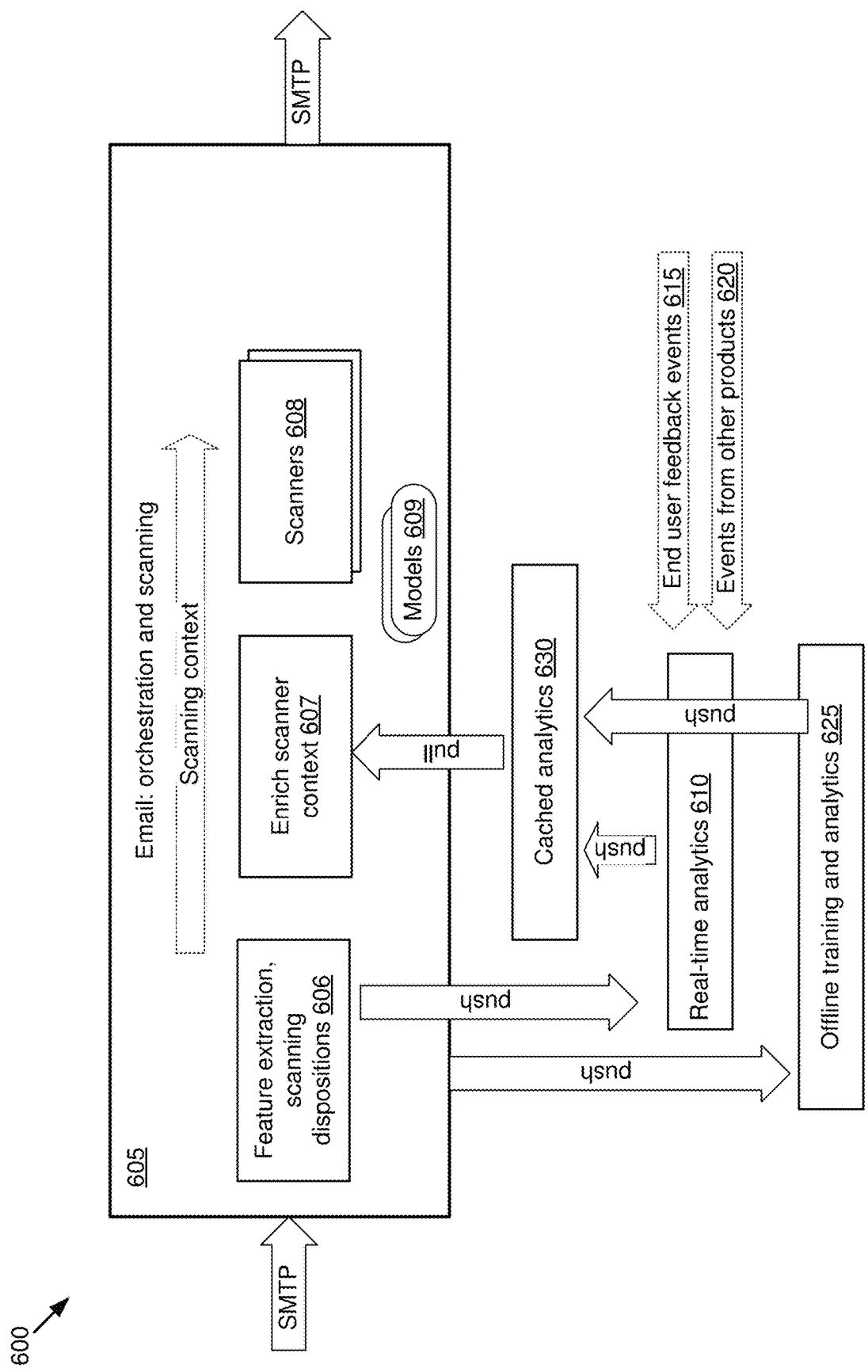
FIG. 6 is an example block diagram that illustrates the interactions between different elements of the network environment, according to some embodiments described herein.

FIG. 6 is an example block diagram that illustrates the interactions between different elements of the network environment 600. In general, the network environment may include a scanner context 605, real-time analytics 610, offline training and analytics 625, and cached analytics 630. Each of the entities depicted in FIG. 6 may, for example, be implemented on one or more computing devices such as the computing device 200 described with reference to FIG. 2. A number of systems may be distributed across these various elements to support the identification of suspicious email messages, such as the scanner context 605, the real-time analytics 610, the offline training and analytics 625, and the cached analytics 630, each of which may include software components executing on any of the foregoing system components, and each of which may support improved detection of suspicious email messages.

The scanner context 605 performs orchestration and scanning of incoming email messages in order to provide a scanning context during an SMTP session. The scanner context 605 includes feature extraction, scanning dispositions 606, enrich scanner context 607, and scanners 608.

The orchestration aspect of the scanner context 605 may include what types of elements in the network environment 600 to use based on policy. For example, the policy may dictate that certain scanners 608 are not applicable if an email message originates from an administrator. In some embodiments, administrators may define and enforce policies that control access to and use of the scanner context 605. Administrators may update policies such as by designating authorized users and conditions for use and access. The scanner context 605 may update and enforce those policies at various levels of control that are available.

The feature extraction, scanning dispositions 606 extract raw per-email data from the email messages, such as information from the SMTP protocol as the email messages were received, such as senders and recipients of an email message; an SMTP client Internet Protocol (IP) address associated with an email message; a number of email messages that were delivered in an SMTP session; results of a reputation lookup on the SMTP client IP address; and/or whether a sender passed one or more of a Domain-based Message Authentication, Reporting and Conformance (DMARC) test, Domain Keys Identified Mail (DKIM) test, or a Sender Policy Framework (SFP) test.

The enrich scanner context 607 may include details of a history of correspondence between the sender and the recipient, how many of the email messages were initiated by a customer and not by an external person, and/or what was an average length of each exchange. The data added by the enrich scanner context 607 content may include whether the sender has an affinity with other senders or clusters of senders and, if so, a corresponding reputation score. The data added by the enrich scanner context 607 may include whether the email message is part of a suspicious pattern of correspondence, such as when an unknown external sender emails certain groups of customer recipients unprompted. The data added by the enrich scanner context 607 may include machine-learning scores for machine-learning models that were exposed to the email message and a corresponding graph of correspondence that includes the email message.

The scanners 608 may each perform specific functions. For example, one scanner 608a may lookup reputations of a sender in third-party DNS RBLs, another scanner 608b may lookup reputations of a sender in internal systems, and another scanner 608c may lookup reputations of a sender in internal systems with regard to specific attributes, such as a client IP address, a sender domain, and/or an EHLO domain.

The scanner context 607 may use different models 609 to perform different scanning functions. The models 609 may be rule-based, machine-learning models, or a combination of both (e.g., one rule-based model and a plurality of machine-learning models).

The results of the scanner context 605 are pushed to the real-time analytics 610 for behavior pattern generation and to the offline training and analytics 625 for batch processing.

The real-time analytics 610 tracks email conversation states as they evolve in real-time. In some embodiments, the real-time analytics 610 generates behavior patterns based on the historical behavior of emails. For example, the real-time analytics 610 identifies that a sender has started acting suspiciously.

In some embodiments, the real-time analytics 610 determines whether to deliver an email message to a recipient. For example, the real-time analytics 610 receives features extracted from the feature extraction, scanning dispositions 606 associated with the email message. In some embodiments, the real-time analytics 610 determines whether content of the email message matches at least one criterion for suspicious content and determines reputation scores for each of the senders based on a comparison of the extracted features to the behavior patterns. If the content of the email message matches the at least one criterion for suspicious content and/or the reputation score is less than a reputation threshold, the real-time analytics 610 may perform protective actions. The protective actions may include withholding the email message from the recipient, providing the email message to the recipient with certain features (e.g., an ability to download attachments) disabled, providing the email message to the recipient with an option to report the email message as suspicious, etc.

In some embodiments, the real-time analytics 610 also uses end user feedback events 615 and events from other products 620.

End user feedback events 615 includes a recipient's reactions to the protective actions. For example, if the recipient receives the email and chooses to download the attachment, the real-time analytics 610 may update parameters to account for the email message being less suspicious than was previously determined. In another example, if the recipient receives the email message and reports the email message as suspicious, the real-time analytics 610 may reinforce parameters to emphasize that the protective actions were properly performed.

The events from other products 620 may include other sources of email message analysis. For example, the other products 620 may include any networked computer-based infrastructure. For example, the other products 620 may be corporate, commercial, organizational, educational, governmental, or the like. Other products 620 may also or instead include a personal network such as a home or a group of homes. The other products' 620 computer network may be distributed amongst a plurality of physical premises such as buildings on a campus, and located in one or in a plurality of geographical locations.

The other products 620 may include a firewall, a wireless access point, an endpoint, a server, a mobile device, an appliance or Internet-of-Things (IoT) device, and/or a cloud computing instance. The other products 620 may be implemented in hardware (e.g., a hardware firewall, a hardware wireless access point, a hardware mobile device, a hardware IoT device, etc.) or in software (e.g., a virtual machine configured as a server or firewall or mobile device).

The other products 620 may provide particular analysis of different systems in the network environment 600, such as an analysis of threats to a firewall, a wireless access point, an endpoint, a server, a mobile device, an IoT, and/or a cloud computing instance. For example, the particular analysis may include Data Loss Prevention (DLP) that monitors and restricts the transfer of files containing sensitive data. The other products 620 may provide information about remedial actions taken when threats were present, such as sandboxing, quarantining, removing, or otherwise remediating or managing malicious code or malicious activity.

In some embodiments, the offline training and analytics 625 aggregates all data from the elements of the network environment 600 for processing. The offline training and analytics 625 may perform batch processing to discover patterns and outliers in the data. The offline training and analytics 625 includes so much data that it is a separate analysis from the real-time analytics 610. In some embodiments, the offline training and analytics 625 provide the patterns and outliers to a machine-learning model associated with the cached analytics 630.

In some embodiments, the cached analytics 630 receives information from both the offline training and analytics 625 and the real-time analytics 610. The cached analytics 630 may discard data that is older than a predetermined time period so that the cached analytics 630 is fresh and a smaller amount of data that is more manageable for quick decisions. For example, the cached analytics 630 may define data as stale if it is older than an hour, a day, etc.

In some embodiments, the cached analytics 630 includes a machine-learning module that uses the patterns and outliers from the offline training and analytics 625 as training data to help train the machine-learning module to discriminate between email messages with suspicious content and email messages with safe content. In some embodiments, the machine-learning module receives data from the real-time analytics 610 to keep the machine-learning module current.

In some embodiments, the cached analytics 630 transmits data to the enrich scanner context 607 to enrich the input to various elements of the network environment 600 including any downstream processing elements.

In some embodiments, the cached analytics 630 is not part of the network environment 600. Instead of storing the analytics in a cache, in some embodiments the enrich scanner context 607 sends a query event to the real-time analytics 610 and receives a response directly from the real-time analytics 610 containing the analytics.

Example Method 700

Figure 7:
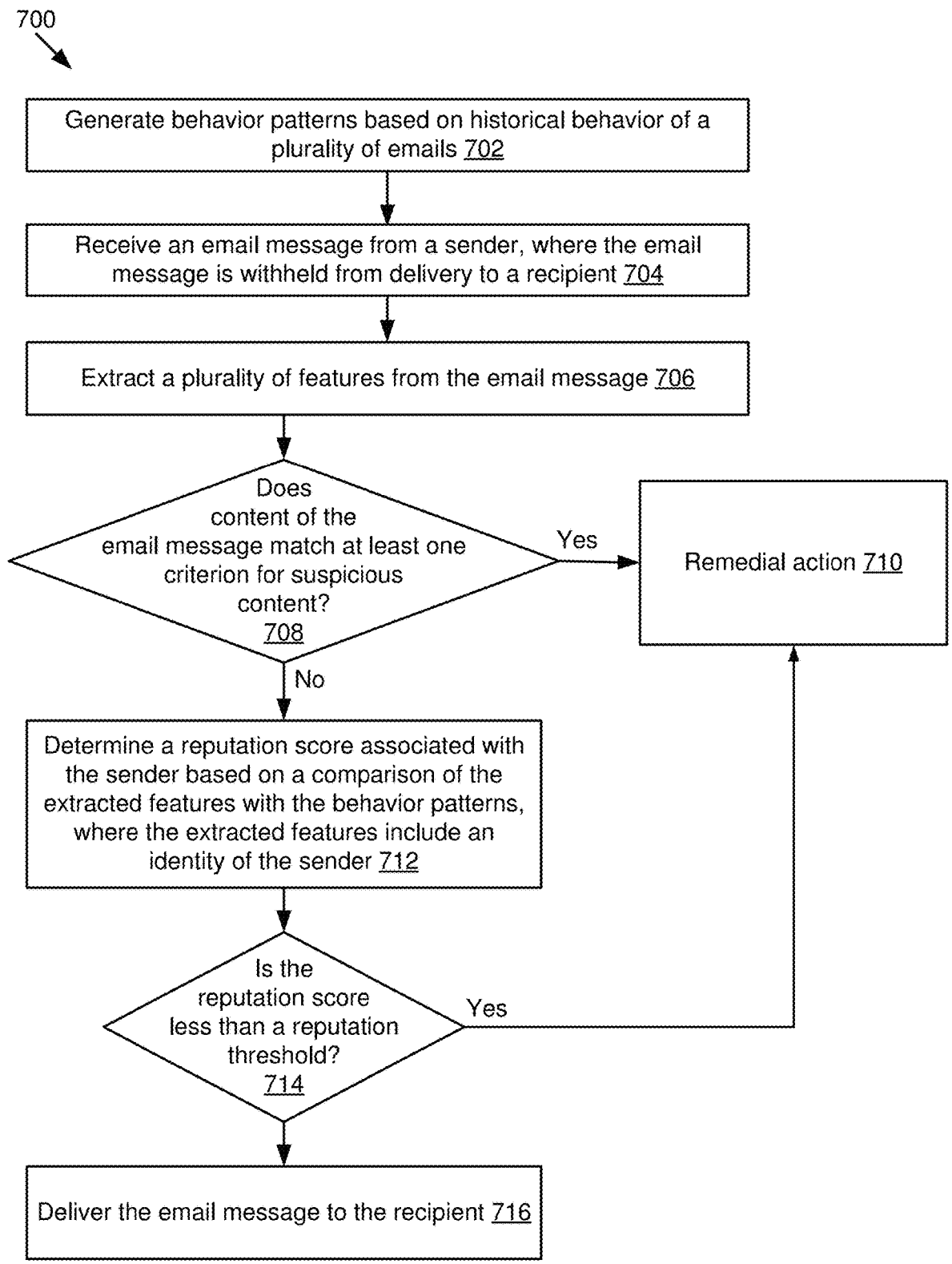
FIG. 7 is an example flow diagram to determine whether to deliver an email message to a recipient, according to some embodiments described herein.

FIG. 7 is an example flow diagram 700 to determine whether to deliver an email message to a recipient. The method illustrated in flowchart 700 is performed by a computing device 200 where the computing device 200 may be user device 115, an email server 101, or in part a user device 115 and in part an email server 101.

The method 700 may begin at block 702. At block 702, behavior patterns are generated based on historical behavior of a plurality of emails. Block 702 may be followed by block 704.

At block 704, an email message is received from a sender, where the email message is withheld from delivery to a recipient. Block 704 may be followed by block 706.

At block 706, a plurality of features are extracted from the email message, Block 706 may be followed by block 708, For example, the extracted features may be any information that was extracted by the scanner 202 in FIG. 2.

At block 708, it is determined whether the content of the email message matches at least one criterion for suspicious content. If the content of the email message matches at least one criterion for suspicious content, block 708 may be followed by block 710. At block 710, a remedial action is taken. For example, the recipient may receive an alert that the email is suspicious, an email with attachments removed, an email with a warning explaining why the email is suspicious, etc. In another example, the email may be quarantined. In some embodiments, the recipient may indicate that the email is not suspicious and, in that case, the feedback may be used to improve the process.

If the content of the email message does not match at least one criterion for suspicious content, block 708 may be followed by block 712. At block 712, a reputation score associated with the sender is determined based on a comparison of the extracted features with the behavior patterns, where the extracted features include an identity of the sender. Block 712 may be followed by block 714. Although FIG. 7 illustrates 712 as following 708, other embodiments are possible, such as performing 708 and 712 independently of each other.

At block 714, it is determined whether the reputation score is less than a reputation threshold. If the reputation score is less than a reputation threshold, block 714 may be followed by block 710. At block 710, the recipient is alerted that the email message is suspicious.

If the reputation score meets the reputation threshold, block 714 may be followed by block 716. At block 716, the email message is delivered to the recipient. In some examples, the email message may include an option for a user to report that the email is suspicious. If the user reports that email as suspicious, the feedback may be used to improve the process.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities, Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
performing, during offline analysis, processing of email data associated with a plurality of email messages to identify historical patterns and outliers in the plurality of email messages;
generating, independent of the processing of the email data, behavior patterns based on historical behavior of at least a subset of the plurality of email messages;
generating cached analytics from the historical patterns, the outliers, and the behavior patterns, wherein the generating includes discarding corresponding historical patterns, corresponding outliers, and corresponding behavior data associated with the email data that is older than a predetermined time period;
receiving an email message from a first sender, wherein the email message is withheld from delivery to a recipient;
extracting features from the email message;
providing the extracted features as input to a machine-learning model, wherein the machine-learning model is trained using the cached analytics;
comparing, with the machine-learning model, the extracted features to the cached analytics by:
determining whether content of the email message matches at least one criterion for suspicious content; and
determining a reputation score associated with the first sender based on a comparison of the extracted features with the behavior patterns and an association of the first sender to an other sender with a low reputation score, wherein the extracted features include an identity of the first sender; and
responsive to the content of the email message not matching the at least one criterion for suspicious content and the reputation score meeting a reputation threshold, delivering the email message to the recipient.

2. The method of claim 1, wherein the other sender has the low reputation score based on performing an action selected from a group of actions including sending email messages with an attachment and no text in a body of the plurality of email messages, sending email messages with a filename for an attachment that is known to be associated with malicious content, and combinations thereof.

3. The method of claim 1, wherein the at least one criterion for suspicious content includes a sender name that was previously identified to be associated with a new domain name and further comprising:
normalizing the new domain name by performing one or more normalizations selected from a group of case flattening, whitespace normalization, homograph flattening, nickname normalization, initials normalization, and combinations thereof;
comparing the normalized domain name to previously seen email addresses to determine if the normalized domain name is new.

4. The method of claim 1, further comprising:
responsive to the content of the email message not matching any criterion for suspicious content and the reputation score being less than the reputation threshold, alerting the recipient that the email message is suspicious.

5. The method of claim 4, wherein alerting the recipient that the email message is suspicious includes providing a user interface that includes an alert and an option to ignore the alert and provide the email message to the recipient.

6. The method of claim 1, further comprising:
generating, cached analytics; and
comparing the extracted features to the cached analytics;
wherein providing the email message to the recipient is further responsive to the comparing the extracted features to the cached analytics not identifying the suspicious content.

7. The method of claim 1, wherein the machine-learning model is further trained based on feedback events that include a recipient's reactions to protective acts performed responsive to determining that one or more of the plurality of email messages include suspicious content.

8. The method of claim 1, wherein the extracted features include one or more of:
information from a Simple Mail Transfer Protocol (SMTP) process that generates the email message;
results from one or more scanners that perform the scanning; or
data added by an enriched scanner context.

9. The method of claim 8, wherein the information from the SMTP process includes one or more of:
an SMTP client Internet Protocol (IP) address associated with the email message;
a number of email messages that were delivered in an SMTP session, wherein the email message is included in the SMTP session;
results of a reputation lookup on the SMTP client IP address;
whether the first sender passed one or more of a Domain-based Message Authentication, Reporting and Conformance (DMARC) test, a Domain Keys Identified Mail (DKIM) test, or a Sender Policy Framework (SPF) test;
a HELO parameter or an Extended HELO (EHLO) parameter;
SMTP verbs;
whether the email message exited the SMTP early; or
whether the email message sent an SMTP command before a response from a previous command was received.

10. The method of claim 8, wherein the results from the one or more scanners include one or more of:
one or more results of reputation lookup in a third-party Domain Name System-based Remote Block List (DNS RBL);
one or more results of reputation lookup in local systems; or
one or more results of reputation lookup in local systems that are based on a client IP address, a sender domain, or a domain included in an Extended HELO (EHLO) command.

11. The method of claim 8, wherein the data added by the enriched scanner context includes:
whether the first sender has an affinity with clusters of other senders based on the first sender and the clusters other senders emailing a same group of recipients and corresponding reputation scores for the clusters of other senders; and
machine-learning scores for machine-learning models that were exposed to the email message and a corresponding graph of correspondence that includes the email message.

12. A system comprising:
one or more processors; and
one or more computer-readable media, having instructions stored thereon that, when executed by the one or more processors, cause the one or more processors to perform operations comprising:
performing, during offline analysis, processing of email data associated with a plurality of email messages to identify historical patterns and outliers in the plurality of email messages;
generating, independent of the processing of the email data, behavior patterns based on historical behavior of at least a subset of the plurality of email messages;
generating cached analytics from the historical patterns, the outliers, and the behavior patterns, wherein the generating includes discarding corresponding historical patterns, corresponding outliers, and corresponding behavior data associated with the email data that is older than a predetermined time period;
receiving an email message from a first sender, wherein the email message is withheld from delivery to a recipient;
extracting features from the email message;
providing the extracted features as input to a machine-learning model;
comparing, with the machine-learning model, the extracted features to the cached analytics by:
determining whether content of the email message matches at least one criterion for suspicious content; and
determining a reputation score associated with the first sender based on a comparison of the extracted features with the behavior patterns and an association of the first sender to an other sender with a low reputation score, wherein the extracted features include an identity of the first sender; and
responsive to the content of the email message not matching the at least one criterion for suspicious content and the reputation score meeting a reputation threshold, delivering the email message to the recipient.

13. The system of claim 12, wherein the first sender is determined to be associated with the other sender based on the first sender emailing the other sender more than a threshold number of times.

14. The system of claim 12, wherein the operations further comprise:
responsive to the content of the email message not matching any criterion for suspicious content and the reputation score being less than the reputation threshold, alerting the recipient that the email message is suspicious.

15. The system of claim 12, wherein the extracted features include one or more of:
information from a Simple Mail Transfer Protocol (SMTP) process that generates the email message;
results from one or more scanners that perform the scanning; or
data added by an enriched scanner context.

16. A computer-program product that includes one or more non-transitory computer-readable media with instructions stored thereon that, when executed by one or more computers, cause the one or more computers to perform operations comprising:
performing, during offline analysis, processing of email data associated with a plurality of email messages to identify historical patterns and outliers in the plurality of email messages;
generating, independent of the processing of the email data, behavior patterns based on historical behavior of at least a subset of the plurality of email messages;
generating cached analytics from the historical patterns, the outliers, and the behavior patterns, wherein the generating includes discarding corresponding historical patterns, corresponding outliers, and corresponding behavior data associated with the email data that is older than a predetermined time period;

receiving an email message from a first sender, wherein the email message is withheld from delivery to a recipient;

extracting features from the email message;

providing the extracted features as input to a machine-learning model;

comparing, with the machine-learning model, the extracted features to the cached analytics by:
    determining whether content of the email message matches at least one criterion for suspicious content; and
    determining a reputation score associated with the first sender based on a comparison of the extracted features with the behavior patterns and an association of the first sender to an other sender with a low reputation score, wherein the extracted features include an identity of the first sender; and responsive to the content of the email message not matching the at least one criterion for suspicious content and the reputation score meeting a reputation threshold, delivering the email message to the recipient.

17. The computer-program product of claim 16, wherein the operations further comprise:
    providing a user interface that includes the email message and an option to report the email message as suspicious.

18. The computer-program product of claim 16, wherein the operations further comprise:
    responsive to the content of the email message not matching any criterion for suspicious content and the reputation score being less than the reputation threshold, alerting the recipient that the email message is suspicious.

19. The computer-program product of claim 18, wherein alerting the recipient that the email message is suspicious includes providing a user interface that includes an alert and an option to ignore the alert and provide the email message to the recipient.

20. The computer-program product of claim 16, wherein the extracted features include one or more of:
    information from a Simple Mail Transfer Protocol (SMTP) process that generates the email message;
    results from one or more scanners that perform the scanning; or
    data added by an enriched scanner context.

* * * * *